3,168,529
1-(p-LOWER ALKANOYLPHENYL)-5-ARYLPYR-
ROLE-2-PROPIONIC ACID COMPOUNDS
Franklin W. Short, Ann Arbor, Mich., assignor to Parke, Davis & Company, Detroit, Mich., a corporation of Michigan
No Drawing. Filed June 14, 1962, Ser. No. 202,393
7 Claims. (Cl. 260—326.3)

This invention relates to ketonic compounds having a pyrrole nucleus. More particularly, it relates to 1-(p-lower alkanoylphenyl) - 5-arylpyrrole-2-propionic acid compounds of the formula

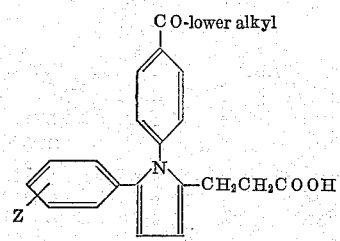

to salts and lower alkyl esters of said compounds and to methods for their production; where Z represents hydrogen, halogen, lower alkyl, lower alkoxy or lower alkylthio. The lower alkyl radicals are preferably those containing not more than 4 carbon atoms.

In accordance with the invention, 1-(p-lower alkanoylphenyl)-5-arylpyrrole-2-propionic acids of the foregoing formula and salts and lower alkyl esters of said compounds can be produced by reacting 6-aroyl-4-oxohexanoic acid compounds of the formula

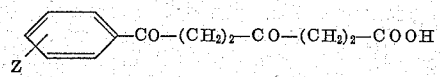

or salts or lower alkyl esters thereof with compounds of the formula

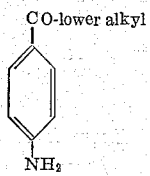

where Z is as defined before. The reaction can be carried out in an unreactive solvent such as toluene, benzene, acetic acid, ethanol, aqueous ethanol, dioxane, dimethyl-acetamide, tetrahydrofuran or mixtures thereof. A preferred solvent is acetic acid. In those cases where one of the reactants is a liquid at the reaction temperature the process can also be carried out without an added solvent. A catalyst such as p-toluenesulfonic acid, benzenesulfonic acid, ethanesulfonic acid, hydrochloric acid, sulfuric acid or other strong acid can be added to the reaction mixture. The process is normally carried out using approximately equimolar quantities of reactants, or a moderate excess of either can be used. The temperature at which the reaction is carried out is not critical. A range of approximately 50° C. to 200° C. is satisfactory, a preferred temperature being from 80° C. to 120° C. Depending on the particular reactants and the temperature, the time required for completion of the reaction varies from a few minutes to a few days. With acetic acid at the reflux temperature, the reaction is usually substantially complete in less than 5 hours.

The product can be isolated in the form of a carboxylic acid or a salt or lower alkyl ester thereof. The carboxylic acids can be converted to salts by reaction with a variety of organic or inorganic bases. Non-toxic salts are formed by reaction with bases such as sodium hydroxide, potassium hydroxide, calcium hydroxide, sodium carbonate, ammonia, 2-hydroxyethylamine and choline. The salts can be converted to the free carboxylic acids by treatment of an aqueous solution of the salt with a mineral acid. The carboxylic acids can be converted to their lower alkyl esters by esterification, such as by heating the carboxylic acid in a lower alkanol containing a small amount of a strong acid. The lower alkyl esters can be converted to the free carboxylic acids by hydrolysis, as by heating a solution of a lower alkyl ester in aqueous methanol with sodium hydroxide or potassium hydroxide and then acidifying the mixture.

Some of the 6-aroyl-4-oxohexanoic acid compounds employed as starting materials in the process of the invention are known, and the others can be prepared by general procedures already described in the literature. As an example, an acetophenone derivative of the formula

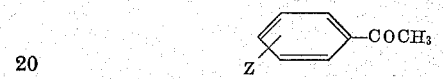

is condensed with 2-furaldehyde of the formula

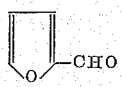

to yield a 3-(2-furyl)acrylophenone compound of the formula

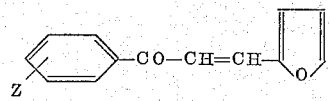

which is then reacted with concentrated hydrochloric acid in ethanol followed by dilute aqueous acid to yield the 6-aroyl-4-oxohexanoic acid compound required as starting material; Z being defined as before. The procedures are described in Berichte, 34, 1263 (1901), Journal of the Chemical Society, 1743 (1939), and various other publications. The 6-aroyl-4-oxohexanoic acid compounds can be converted to their salts and lower alkyl esters by mild treatment with a base or with an esterifying reagent, preferably a mild reagent such as diazomethane.

The products of the invention are useful as pharmacological agents and as chemical intermediates. They are anti-inflammatory agents and are of value in reducing inflammation and alleviating the symptoms of rheumatic, arthritic and other inflammatory conditions. They are active upon either oral or parenteral administration and oral administration is preferred. They can be employed in either free acid, salt or lower alkyl ester form depending on the solubility properties desired.

The invention is illustrated by the following examples.

*Example 1*

A solution of 9.2 g. of 6-(p-ethylbenzoyl)-4-oxohexanoic acid and 4.8 g. of p-aminoacetophenone in 50 ml. of glacial acetic acid is heated under reflux for 5 hours. The solution is cooled, diluted with 50 ml. of water and chilled for complete separation of product. The insoluble 1-(p-acetylphenyl)-5-(p-ethylphenyl)-pyrrole-2-propionic acid which separates is collected on a filter and dried; M.P. 172–173° C. after crystallization from aqueous ethanol.

*Example 2*

A solution of 10.0 g. of 6-(p-methylbenzoyl)-4-oxohexanoic acid and 5.5 g. of p-aminoacetophenone in 50 ml. of glacial acetic acid is heated under reflux for 5 hours. The solution is cooled and diluted with water, and the insoluble 1-(p-acetylphenyl)-5-(p-methylphenyl)-pyrrole-2-propionic acid is collected on a filter; M.P. 222–223° C. after crystallization from butanol.

Example 3

A solution of 10.2 g. of 6-(p-fluorobenzoyl)-4-oxohexanoic acid and 5.5 g. of p-aminoacetophenone in 50 ml. of glacial acetic acid is heated under reflux for 3 hours. The solution is chilled and the insoluble 1-(p-acetylphenyl)-5-(p-fluorophenyl)-pyrrole-2-propionic acid which separates is collected on a filter and dried; M.P. 186–187° C. following crystallization from aqueous acetic acid.

The starting material can be obtained as follows. Equimolar quantities of p-fluoroacetophenone and 2-furaldehyde are gradually added with stirring and external cooling to a 1% solution of sodium methoxide in methanol to give 4'-fluoro-3-(2-furyl)-acrylophenone, M.P. 70° C. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. Alternatively, the compound is boiled with about 5 times its weight of a solution of 2 parts by volume of ethanol to 1 part by volume of hydrochloric acid for about 16 hours, the ethanol is distilled off and the residue is boiled with a mixture of 4 parts of water, 1 part of hydrochloric acid and 1 part of acetic acid. The product is 6-(p-fluorobenzoyl)-4-oxohexanoic acid, M.P. 123–124° C.

Example 4

A solution of 10.7 g. of 6-(p-chlorobenzoyl)-4-oxohexanoic acid and 5.5 g. of p-aminoacetophenone in 50 ml. of glacial acetic acid is heated under reflux for 4 hours, during which time a solid product begins to separate. The mixture is chilled and the insoluble 1-(p-acetylphenyl)-5-(p-chlorophenyl)-pyrrole-2-propionic acid is collected on a filter and dried; M.P. 234–236° C. following crystallization from dimethylformamide-water and digestion with methanol.

The starting material can be obtained as follows. 4'-chloro-3-(2-furyl)-acrylophenone is boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. The product is 6-(p-chlorobenzoyl)-4-oxohexanoic acid, M.P. 139–140° C.

Example 5

A solution of 9.3 g. of 6-(m-chlorobenzoyl)-4-oxohexanoic acid and 4.8 g. of p-aminoacetophenone in 50 ml. of glacial acetic acid is heated under reflux for 5 hours and then chilled. The insoluble product, 1-(p-acetylphenyl)-5-(m-chlorophenyl)-pyrrole-2-propionic acid is collected on a filter, washed with cold acetic acid and dried; M.P. 144–145° C. after crystallization from aqueous ethanol and then from ethyl acetate-petroleum ether.

A solution is prepared by heating and stirring 1 g. of 1-(p-acetylphenyl)-5-(m-chlorophenyl)-pyrrole-2-propionic acid in 20 ml. of 1-normal sodium hydroxide solution. The solution is then chilled and the 1-(p-acetylphenyl)-5-(m-chlorophenyl)-pyrrole-2-propionic acid sodium salt which separates is collected on a filter.

The starting material can be obtained as follows. Equimolar quantities of m-chloroacetophenone and 2-furaldehyde are gradually added with stirring and external cooling to a 1% solution of sodium methoxide in methanol to give 3'-chloro-3-(2-furyl)-acrylophenone. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. The product is 6-(m-chlorobenzoyl)-4-oxohexanoic acid, M.P. 85–86° C.

Example 6

A solution of 9.5 g. of 6-(p-fluorobenzoyl)-4-oxohexanoic acid and 4.5 g. of p-aminopropiophenone in 50 ml. of glacial acetic acid is heated under reflux for 5 hours and then cooled and diluted with water. The insoluble 1-(p-propionylphenyl)-5-(p-fluorophenyl)-pyrrole-2-propionic acid is collected on a filter and dried; M.P. 181–183° C. after crystallization from aqueous ethanol and then from ethyl acetate-petroleum ether.

Example 7

A solution of 10.0 g. of 6-(p-methoxybenzoyl)-4-oxohexanoic acid and 5.2 g. of p-aminoacetophenone in 50 ml. of glacial acetic acid is heated under reflux for 5 hours and then chilled. The insoluble product, 1-(p-acetylphenyl)-5-(p-methoxyphenyl)-pyrrole-2-propionic acid is collected on a filter and dried; M.P. 187–188° C. after crystallization from ethanol.

Example 8

A solution of 7.0 of 6-(p-methoxybenzoyl)-4-oxohexanoic acid and 4.0 g. of p-aminopropiophenone in 35 ml. of glacial acetic acid is heated under reflux for 5 hours and then chilled. The insoluble product, 1-(p-propionylphenyl)-5-(p-methoxyphenyl)-pyrrole-2-propionic acid is collected on a filter and dried; M.P. 149–150° C. after crystallization from aqueous ethanol.

Example 9

A solution of 10.0 g. of 6-(p-ethoxybenzoyl)-4-oxohexanoic acid and 4.9 g. of p-aminoacetophenone in 50 ml. of glacial acetic acid is heated under reflux for 5 hours. The reaction mixture is cooled and diluted with water, and the insoluble 1-(p-acetylphenyl)-5-(p-ethoxyphenyl)-pyrrole-2-propionic acid is collected on a filter; M.P. 178–180° C. after crystallization from ethyl acetate.

The starting material can be obtained as follows. Equimolar quantities of p-ethoxyacetophenone and 2-furaldehyde are gradually added with stirring and external cooling to a 1% solution of sodium methoxide in methanol to give 4'-ethoxy-3-(2-furyl)-acrylophenone, M.P. 78–80° C. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. The product is 6-(p-ethoxybenzoyl)-4-oxohexanoic acid, M.P. 129–131° C.

Example 10

A solution of 10.0 g. of 6-benzoyl-4-oxohexanoic acid and 5.8 g. of p-aminoacetophenone in 50 ml. of glacial acetic acid is heated under reflux for 5 hours and then diluted with 40 ml. of hot water. The mixture is chilled and the insoluble 1-(p-acetylphenyl)-5-phenylpyrrole-2-propionic acid which separates is collected on a filter, washed with cold aqueous acetic acid and dried; M.P. 191–192° C. following crystallization from aqueous ethanol.

A mixture of 5 g. of 1-(p-acetylphenyl)-5-phenylpyrrole-2-propionic acid, 20 ml. of methanol and 0.2 g. of p-toluenesulfonic acid is heated under reflux for 4 hours and then chilled until separation of the insoluble product is complete. This product is collected on a filter and dried. It is 1-(p-acetylphenyl)-5-phenylpyrrole-2-propionic acid methyl ester; M.P. 98–100° C.

A mixture of 5 g. of 1-(p-acetylphenyl)-5-phenylpyrrole-2-propionic acid, 20 ml. of ethanol and 0.2 g. of p-toluenesulfonic acid is heated under reflux for 4 hours. The mixture is refrigerated overnight and the insoluble product is collected on a filter and dried. It is 1-(p-acetylphenyl)-5-phenylpyrrole-2-propionic acid ethyl ester; M.P. 123–125° C.

A solution is prepared by heating and stirring 1 g. of 1-(p-acetylphenyl)-5-phenylpyrrole-2-propionic acid in 20 ml. of 1-normal sodium hydroxide solution. The solution is then chilled and the 1-(p-acetylphenyl)-5-phenylpyrrole-2-propionic acid sodium salt which separates is collected on a filter. The potassium and ammonium salts are prepared by reaction of the free acid with, respectively, potassium hydroxide solution and aqueous ammonia.

*Example 11*

A solution of 10.0 g. of 6-benzoyl-4-oxohexanoic acid, 6.4 g. of p-aminopropiophenone and 10 mg. of p-toluenesulfonic acid in 50 ml. of toluene is heated under reflux for 1 hour with continuous removal of the water formed in the condensate. The reaction mixture is then cooled and the insoluble 1-(p-propionylphenyl)-5-phenylpyrrole-2-propionic acid which separates is collected on a filter, washed with benzene and with petroleum ether and dried; M.P. 168–169° C. following crystallization from ethanol.

*Example 12*

A solution of 10.0 g. of 6-(p-methylthiobenzoyl)-4-oxohexanoic acid and 4.9 g. of p-aminoacetophenone in 50 ml. of glacial acetic acid is heated under reflux for 3 hours and then cooled until separation of the insoluble product is complete. This product is collected on a filter, washed with cold acetic acid and dried. It is 1-(p - acetylphenyl)-5-(p-methylthiophenyl)-pyrrole-2-propionic acid; M.P. 189–190° C. after crystallization from ethanol and from ethyl acetate.

The starting material can be obtained as follows. Equimolar quantities of p-methylthioacetophenone and 2-furaldehyde are gradually added with stirring and external cooling to a 1% solution of sodium methoxide in methanol to give 4'-methylthio-3-(2-furyl)-acrylophenone, M.P. 109–110° C. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. The product is 6-(p-methylthiobenzoyl)-4-oxohexanoic acid; recrystallized from benzene, M.P. 130–132° C.

*Example 13*

A solution of 10.0 g. of 6-benzoyl-4-oxohexanoic acid methyl ester and 5.5 g. of p-aminoacetophenone in 50 ml. of glacial acetic acid is heated under reflux for 3 hours, cooled and diluted with water. The insoluble precipitate of 1-(p-acetylphenyl)-5-phenylpyrrole-2-propionic acid methyl ester is collected; M.P. 98–100° C. following crystallization from methanol.

A mixture of 5 g. of 1-(p-acetylphenyl)-5-phenylpyrrole-2-propionic acid methyl ester, 2 g. of potassium hydroxide and 100 ml. of 50% aqueous methanol is heated under reflux for 2 hours. The resulting solution of 1-(p-acetylphenyl)-5-phenylpyrrole-2-propionic acid potassium salt is diluted with 200 ml. of water and acidified with dilute hydrochloric acid. The insoluble 1-(p-acetylphenyl)-5-phenlypyrrole-2-propionic acid is collected; M.P. 191–192° C. after crystallization from aqueous ethanol.

*Example 14*

A solution of 10.0 g. of 6-(m-methylbenzoyl)-4-oxohexanoic acid and 5.5 g. of p-aminoacetophenone in 50 ml. of glacial acetic acid is heated under reflux for 5 hours. The solution is cooled, diluted with water and chilled for complete separation of product. The insoluble 1 - (p - acetylphenyl)-5-(m-methylphenyl)-pyrrole-2-propionic acid is collected on a filter; M.P. 166–168° C. after crystallization from aqueous ethanol.

The starting material can be obtained as follows. Equimolar quantities of m-methylacetophenone and 2-furaldehyde are gradually added with stirring and external cooling to a 1% solution of sodium methoxide in methanol to give 3'-methyl-3-(2-furyl)-acrylophenone. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. The product is 6-(m-methylbenzoyl)-4-oxohexanoic acid; recrystallized from ethyl acetate-petroleum ether, M.P. 88–90° C.

I claim:

1. A member of the class consisting of compounds of the formula

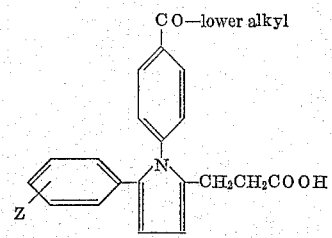

non-toxic salts of said compounds and lower alkyl esters of said compounds; where Z is a member of the class consisting of hydrogen, halogen, lower alkyl, lower alkoxy and lower alkylthio.

2. A compound of the formula

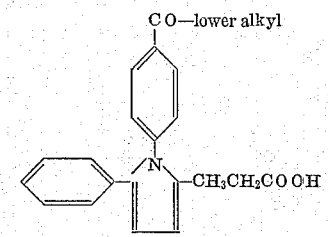

3. 1 - (p-acetylphenyl)-5-(m-methylphenyl)-pyrrole-2-propionic acid.

4. A compound of the formula

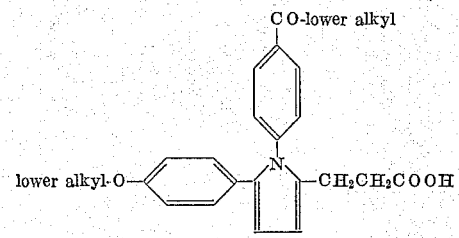

5. 1 - (p-acetylphenyl)-5-(p-methoxyphenyl)-pyrrole-2-propionic acid.

6. 1 - (p - acetylphenyl) - 5-(p-halophenyl)-pyrrole-2-propionic acid.

7. 1 - (p -acetylphenyl)-5-(p-chlorophenyl)-pyrrole-2-propionic acid.

References Cited in the file of this patent

Blicke et al.: "J. Am. Chem. Society," pages 1675–77, vol. 66 (1944).

Holdsworth et al.: "Chemical Abstracts," page 6653[3] vol. 31 (1937).